United States Patent

Steketee et al.

[11] Patent Number: 5,928,128
[45] Date of Patent: Jul. 27, 1999

[54] METHOD FOR THE TREATMENT OF INCINERATION RESIDUES

[75] Inventors: Jacob Jacobus Steketee, Deventer; Leonardus Gerardus Catherina Mathias Urlings, Hoevelaken, both of Netherlands

[73] Assignee: Tauw Milieu B.V., Deventer, Netherlands

[21] Appl. No.: 09/003,175

[22] Filed: Jan. 5, 1998

Related U.S. Application Data

[63] Continuation of application No. 08/436,340, filed as application No. PCT/NL93/00248, Nov. 23, 1993, abandoned.

[30] Foreign Application Priority Data

Nov. 23, 1992 [NL] Netherlands ............... 9202033

[51] Int. Cl.⁶ ............... B09B 3/00; B09B 1/00; A62D 3/00
[52] U.S. Cl. ............... 588/256; 405/128; 435/252.5; 588/251; 588/236
[58] Field of Search ............... 588/205, 236, 588/251, 256; 405/128, 129; 435/262.5

[56] References Cited

U.S. PATENT DOCUMENTS

| | | | |
|---|---|---|---|
| 4,950,409 | 8/1990 | Stanforth | 405/129 |
| 4,981,394 | 1/1991 | McLaren et al. | 405/264 |
| 5,100,633 | 3/1992 | Morrison | 423/232 |
| 5,545,805 | 8/1996 | Chesner | 588/256 |
| 5,569,152 | 10/1996 | Smith | 588/256 |
| 5,593,888 | 1/1997 | Glaze | 435/262.5 |

FOREIGN PATENT DOCUMENTS

A0208871  1/1987  European Pat. Off. .

OTHER PUBLICATIONS

Derwent Abstract of Japanese Patent Application No. A 62,183,896 (Kawasaki).
Derwent Abstract of Japanese Patent Application No. A 55,042,216 (Sumitomo).
Derwent Abstract of Japanese Patent Application No. A 55,147,185 (Ebara).
Derwent Abstract of Japanese Patent Application No. A 1,284,382 (Nippon Kokan).
Derwent Abstract of Japanese Patent Application No. A 63,065,988 (Hitachi).
Derwent Abstract of Japanese Patent Application No. A 59,006,196 (Fiji).
Derwent Abstract of Japanese Patent Application No. A 54,131,623 (Mitsubishi).
Theodore et al., *Introduction to Hazardous Waste Incineration*, 1987, John Wiley & Sons, NY, NY, pp. 44–45.

*Primary Examiner*—Gary P. Straub

[57] ABSTRACT

This invention relates to a method for the treatment of incineration residues which are produced, for example, in the incineration of domestic waste, in which method said residues are treated with gas containing $CO_2$. In the treatment, microorganisms may be used which are already present naturally in the incineration residues or can be added thereto. The invention furthermore relates to the use of incineration residues as absorption material for the removal of $CO_2$ from exhaust gases.

17 Claims, 2 Drawing Sheets

5,928,128

METHOD FOR THE TREATMENT OF INCINERATION RESIDUES

RELATED APPLICATION

This application is a continuation of commonly assigned application Ser. No. 08/436,340 filed Jun. 28, 1995, now abandoned which is a '371 of PCT/NL 93/00248, Nov. 23, 1993.

BACKGROUND OF THE INVENTION

1. Field of the Invention

The invention relates to a method for the treatment of incineration residues.

2. Introduction to the Invention

It is known that residues from the incineration of waste, in particular of domestic waste and waste comparable thereto, are usable as foundation material and embankment material in road construction and as gravel substitute in concrete (C.R.O.W. (1988): Residues are (no longer) waste—WIP slags. Publication 15, Stichting C.R.O.W., Ede [1]; Leenders, P. (1984): Management of Solid Waste Incinerator Residues in The Netherlands. In: K. J. Thomé-Kozniensky (ed.): Recycling International, Vol. 2, p. 1420–1441. EF-Verlag, Berlin [2]).

Such residues often referred to a WIP slags, must fulfil certain civil-engineering and environmental-hygiene quality requirements, depending on the field of application. The environmental-hygiene quality requirements can be subdivided into requirements relating to the composition and requirements relating to the leachability of the product. As far as the territory of the Netherlands is concerned, these environmental-hygiene quality requirements relating to the leachability of the product. As far as the territory of the Netherlands is concerned, these environmental-hygiene quality requirements will be laid down in the so-called Building Materials Order, a General Order in Council (AMVB) within the framework of the Soil Protection Act. In said AMVB, a draft of which has been published, the stress is placed on the quality requirements relating to leaching. Of the civil engineering quality requirements which are imposed on applications as foundation material the requirements relating to unincinerated and digestible material are particularly important. For applications as gravel substitute in concrete, the pH is also important.

In order to meet the requirements of the Building Materials Order, it is often necessary to suppress the leaching of heavy metals from WIP slags. Such processes, generally referred to as immobilization processes, are generally known and are subdivided into physico-chemical and thermal processes. The object of physico-chemical processes is to produce a hard, low-porosity and durable matrix by using binders and other aggregates and at the same time fix impurities in the form of sparingly soluble compounds.

The formation of a hard matrix according to known methods, in which, for example, use is made of a binder is in general not a problem. According to leaching tests, however, in many cases no chemical binding of impurities occurs. After reduction of the matrix, the leaching is often again at the level of the starting material. Another weak point of the present physico-chemical immobilization processes is the use of relatively large amounts (typically 10–50% on a weight basis) of expensive aggregates such as cement.

The object of thermal processes is to incorporated impurities in a silicate matrix by means of sintering or melting of the material. From tests it is found that the impurities are often fixed well. A disadvantage of the process is that the costs are high as a consequence of the high investment and the considerable energy consumption.

SUMMARY OF THE INVENTION

This invention provides a method of treating solid incineration residues resulting from the incineration of waste materials (often referred to herein simply as WIP slags), in which the residues are treated with gas containing 0.1 to 100% by volume of carbon dioxide ($CO_2$), preferably at a temperature from the ambient temperature up to 200° C. under a pressure from atmospheric pressure up to 10 bar. The content of $CO_2$ is higher than the content in the atmosphere.

BRIEF DESCRIPTION OF THE DRAWING

The invention is illustrated in the accompanying drawings, in which.

DETAILED DESCRIPTION OF THE INVENTION

Figure 1:
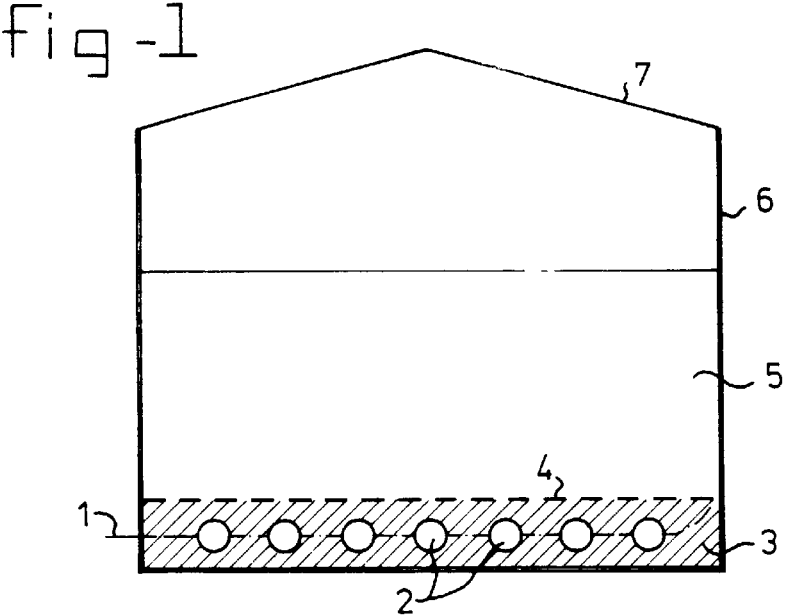
FIG. 1 is a diagrammatic cross-section through and apparatus for carrying out the invention.

The method of the invention can be carried out at ambient temperature (approximately 0–30° C.) and atmospheric pressure (approximately 1 bar). Increasing pressure and temperature results, however, in an acceleration of the reactions.

Good results have been obtained with gas having $CO_2$ contents of at least 1, for example, approximately 5–20, in particular approximately 8% by volume, a temperature of at most 100° C., for example approximately 20–70° C., more particularly approximately 20–50° C. and an overpressure of at most 1 atmosphere.

The present method has similarities to the known physico-chemical immobilization processes, but differs therefrom in the respect that now hard matrix is formed. Another difference is that use is also made of microbiological in which case the method can be described as a chemical immobilization process whose efficiency is increased by microbiological conversions.

The existing immobilization processes are characterized by an inadequate fixing of impurities and/or a relatively high cost level, as a result of which treatment of residues produced in bulk amounts is impracticable.

The reaction of $CO_2$ with the basic WIP slag results in the formation of carbonates and a (re)carbonating process is therefore involved. Not only the formation of carbonates, however, is important for the fixing of heavy metals and metalloids. It is also important that the pH of the material is modified in such a way that the leachability of the product is reduced. This pH control is, moreover, important for the optimization of microbiological reactions. Most microorganisms (particularly bacteria) cannot grow at the strongly basic pH value which the untreated WIP slags may have. A decrease in the pH to slightly basic values, for example 7–8.5 increases not only the usability of the slags as aggregates for concrete and the like, but also the possibilities for the growth of microorganisms to a considerably extent. Additionally, the activity of microorganisms can be improved by adding nutrients and by addition to the slag of microorganisms (such as bacterial and mould cultures). The favourable action of the microorganisms is based on the degradation of unincinerated organic material and nitrogen, for example materials containing ammonium groups. Apart from the contribution of these substances as such to the leaching, they also play a role in the leaching of metals. Both organic substances (acids, humic materials and the like) and ammonium groups may form metal complexes.

An important effect of the treatment is that the civil-engineering quality of the slag is also appreciably improved. By lowering the pH, the risk of destructive expansion, such as the conversion of pieces of metallic aluminium to aluminium hydroxide, becomes appreciably lower. Furthermore, the material becomes much more suitable for use as a gravel substitute in concrete.

No particular requirements are imposed on the $CO_2$ to be used and the gas mixture containing the $CO_2$, except that the gas mixture preferably contains oxygen and is saturated with water. The oxygen is necessary for the microbiological reactions to proceed. Use of water vapour serves to prevent the slag from drying out. The microorganisms may be inhibited or even die owing to lack of water.

The $CO_2$ can be obtained from a supplier and diluted with air. A (purified) flue gas or off-gas from a biological process is, however, also suitable as $CO_2$ source. A requirement which has to be imposed on these gas mixtures is that the impurity which may be present in the gas must not be such that the quality of the slag decreases significantly by means of adsorption processes.

If off-gases are used as $CO_2$ source, the treatment makes a direct contribution to the reduction of the $CO_2$ emission. In this variant, the method is therefore to be regarded as a $CO_2$ removal process. The WIP slags may in this case be regarded as an adsorbent, which is a new application for this material.

The time for which the slags have to be treated with $CO_2$-rich gas is dependent on the process conditions which are applied (pressure, temperature, $CO_2$ content). This time varies from one hour (at increased pressure and temperature) to approximately 8 weeks. Under a pressure of approximately 1 atmosphere and at a temperature of approximately 20° C., a dwell time of two to four weeks will in general be adequate.

As stated, the pressure varies in general between atmospheric pressure and 10 bar overpressure. In a typical embodiment of the process in which microorganisms are used, an overpressure of 0.01–0.1 bar is employed.

A possible device in which the method according to the invention can be carried out is shown diagrammatically in FIG. 1. In this figure:

1 is the feed line for a $CO_2$-rich gas mixture;

2 are perforated tubes;

3 is a layer of gravel and coarse sand or comparable material in which the perforated tubes are imbedded;

4 is a perforated floor suitable for vehicles;

5 is a layer of WIP slags having a thickness of 0.5–5 m;

6 is a concrete tank which can be sealed at the top with, for example, canvas.

The $CO_2$-rich gas flows upwards through the slag layer via the distribution system formed by 2 and 3. It escapes at the tope of the slag layer and, depending on the composition, it will then be recirculated, discharged directly, discharged via a filter or used as incineration air for a furnace.

Depending on the extent of the slag stream to be treated, the concrete tank should be divided into sections. For semicontinuous operation, a minimum of two sections should always be present and alternately, material is being treated in one section or the section is emptied, while the other section is being filled.

During the filling of the sections and during the treatment, inoculation material and nutrients can be added if desired.

A continuous operation is possible as a result of making use of horizontally arranged drums with which the slag is conveyed with the aid of a rotating movement. The $CO_2$-rich gas is blown through the drum. An alternative is to use a vertically arranged silo which is filled at the top and is emptied at the bottom. The $CO_2$-rich gas is blown upwards through the silo.

Figure 2:
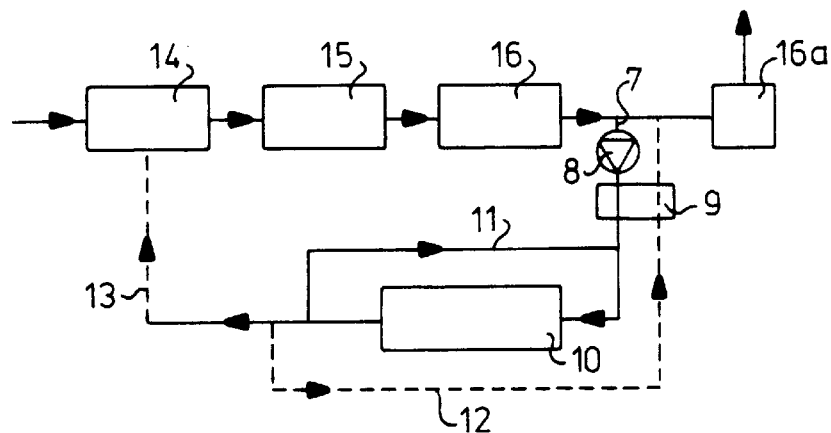
FIGS. 2 and 3 are flow diagrams for alternative methods of the invention.
Figure 3:
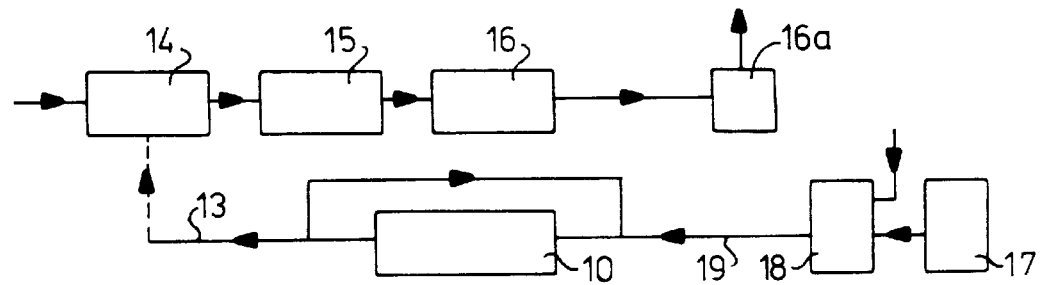

Since the use of large volumes of $CO_2$-rich gas is characteristic of the process, usable gas flows are considered in greater detail in FIGS. 2 and 3.

An adequately purified flue gas, for example a flue gas which meets the requirements of the Dutch "1989 incineration directive" can be used as $CO_2$ source. In FIG. 2, this gas flow is indicated by 7. In FIG. 2, the reference numerals furthermore denote:

8—a compressor;

9—a heat exchanger (optional, only necessary if the temperature of the flue gas is too high);

10—the slag treatment unit (in accordance with FIG. 1);

11—a recirculation flow;

12—the return flow of the used flue gas;

13—an alternative for 12, in which the used flue gas is fed as incineration air to furnace 14;

15—a kettle;

16—a flue gas purification system;

16a—a chimney.

The relative merit of removal of the gas via 12 or 13 is primarily a technical/economic question and may vary for each installation. If impermissible amounts of volatile impurities were to be released from the slags, removal via 13 would be necessary.

In both case, the gas flow of the slag treatment unit can be completely integrated in the gas flow through the WIP.

If the quality of flue gas produced by the WIP is inadequate and not other clean, $CO_2$-rich off-gas flow is available, a $CO_2$-rich gas flow can be created by mixing $CO_2$ (industrial quality) with air. Possibly, 100% by volume of $CO_2$ can also be used as gas flow. The $CO_2$ can be obtained from a gas supplier or separated from the flue gas on site.

The alternative in which pure $CO_2$ is used is shown diagrammatically in FIG. 3. Here:

17 is the feedstock vessel containing $CO_2$;

18 is a gas mixing plant in which $CO_2$ and air are mixed;

19 is the feed line for the $CO_2$-rich gas;

10 is the slag treatment unit (according to FIG. 1);

13 is the outlet of gas to the furnace 14.

This outlet would only be necessary if unacceptable amount of volatile impurities were to be released from the slag. Otherwise direct discharge of the off-gas (if necessary via a simple biofilter) is possible.

In addition to the arrangement shown in FIG. 1 for batchwise performance of the process, the method according to the invention can be carried out continuously by bringing the residue to be treated into contact with $CO_2$-rich gas in a mixing drum, silo or comparable processing apparatus.

From the above description it will clear that the method can be used either with or without added microorganisms. In the typical performance of the process, however, microorganisms are used. It is pointed out that microorganisms may already present naturally in the material to be treated. It is, however, also possible to "inoculate" the material to be treated with material which has already undergone a treatment and which contains microorganisms. These microorganisms generally consume oxygen.

Whether or not microorganisms are used or are present is decisive for the conditions to be chosen in the method according to the invention. Thus, the presence of water is essential if microorganisms are used and a gas containing water vapour will preferably be used, preferably gas which contains not only carbon dioxide in the abovementioned amounts but is also saturated with water vapour. If microorganisms are used, the temperature will in general not be higher than approximately 70° C. Work will be carried out under the abovementioned slight overpressure of not more than 1 bar.

If work is carried out without using microorganisms, the temperature may, however, be 200° C. or higher, for example 300° C. or 400° C., but the latter are generally rejected for practical reasons. The presence of water vapour may be advantageous, but is not required. It is also true of the pressure that extreme conditions can be used, and a pressure of 3 or 4 bar may be desirable, but pressures of 10, 20 or 50 bars may also, however, be used but at the same time the higher pressures are often undesirable for practical reasons.

It is obvious that the incineration residues which can be treated according to the method of the invention are preferably present in finely divided form, for example in the form of particles having a size in the range of 0–4 cm.

As has already been stated above, incineration residues can also be used for the removal of $CO_2$ from $CO_2$-rich off-gases. The invention therefore also relates to the use of incineration residues as absorption material for the removal of $CO_2$ from $CO_2$-rich off-gases, such as flue gases, biogas, disposal-site gas or off-gas from composting plants.

Within the scope of the above description, incineration residues are understood as meaning solid residues which are formed in the incineration of waste substances in furnaces. Such residues can be the relatively coarse ingredients which remain behind in the furnace, often referred to as slags, and/or the fine constituents which escape with the flue gases and are collected in electrostatic filters, often referred to as fly ashes. After slaking, the slags/often undergo a final processing in the form of removal of iron and crushing and/or removal by sieving of coarse constituents. This results in a grading of, for example, 0–4 cm.

EXAMPLE 1

A test arrangement on a laboratory scale was employed. An amount of WIP slags of approximately 1 kg was contained in a column having a height of 0.5 m. Air (the reference) or $CO_2$-enriched air (approximately 8% by volume) flowed upwards through this column. The gas flow rate was set at 5 l/hour, the temperature was approximately 25° C. and the overpressure approximately 0.1 bar. The treatment was continued for 10 weeks. The leachability of the slag was determined, before and after the treatment, with the aid of a shaking test. The slag was shaken for 23 hours with demineralized water (acidified with nitric acid to a pH of 4), with a liquid/solid (L/S) ration of 10 (method in accordance with NEN 7343).

Table 1 shows the chemical oxygen demand (COD) and the leachable content of various metals in the slag before and after the various treatments.

Table 1 shows the chemical oxygen demand (COD) and the leachable content of various metals in the slag before and after the various treatments. From Table 1 it is clear that the leachability of certain metals has fallen under both conditions, but that the effect is appreciably increased by adding $CO_2$. Thus, it holds true for copper that the decrease is 84% with an increased $CO_2$ concentration, compared with 58% when air is passed. The decrease in the molybdenum leaching increases from 57% to 81%. without $CO_2$ being added, the aluminium leaching increases somewhat (+6%) but with $CO_2$ the aluminium leaching falls by 95%. The treatment is not efficient for antimony and zinc.

It is also clear that the pH falls appreciably (to approximately 8), and this is beneficial for the civil-engineering quality.

EXAMPLE 2

At the end of the experiment described in Example 1, the bacterial and mould counts of the material were determined. For this purpose, dilution series were made of the shaking liquid obtained by shaking for 23 hours with L/S 10. These dilutions were applied to PCA plates and maltose-agar plates. The number of colonies on these plates was counted after 2 (PCA) or 3 (maltose-agar) days. From the results (see Table 2) it is evident that a beneficial environment has been produced for bacteria as a result of treatment with $CO_2$. Bacteria are not detectable in the reference column. A more diverse microflora is beneficial for the degradation of residual (unincinerated) organic matter. The development of a bacteria population is in agreement with the observed greater decrease in the COD leaching (see Table 1) of the material which has been treated with additional $CO_2$.

EXAMPLE 3

Figure 4:
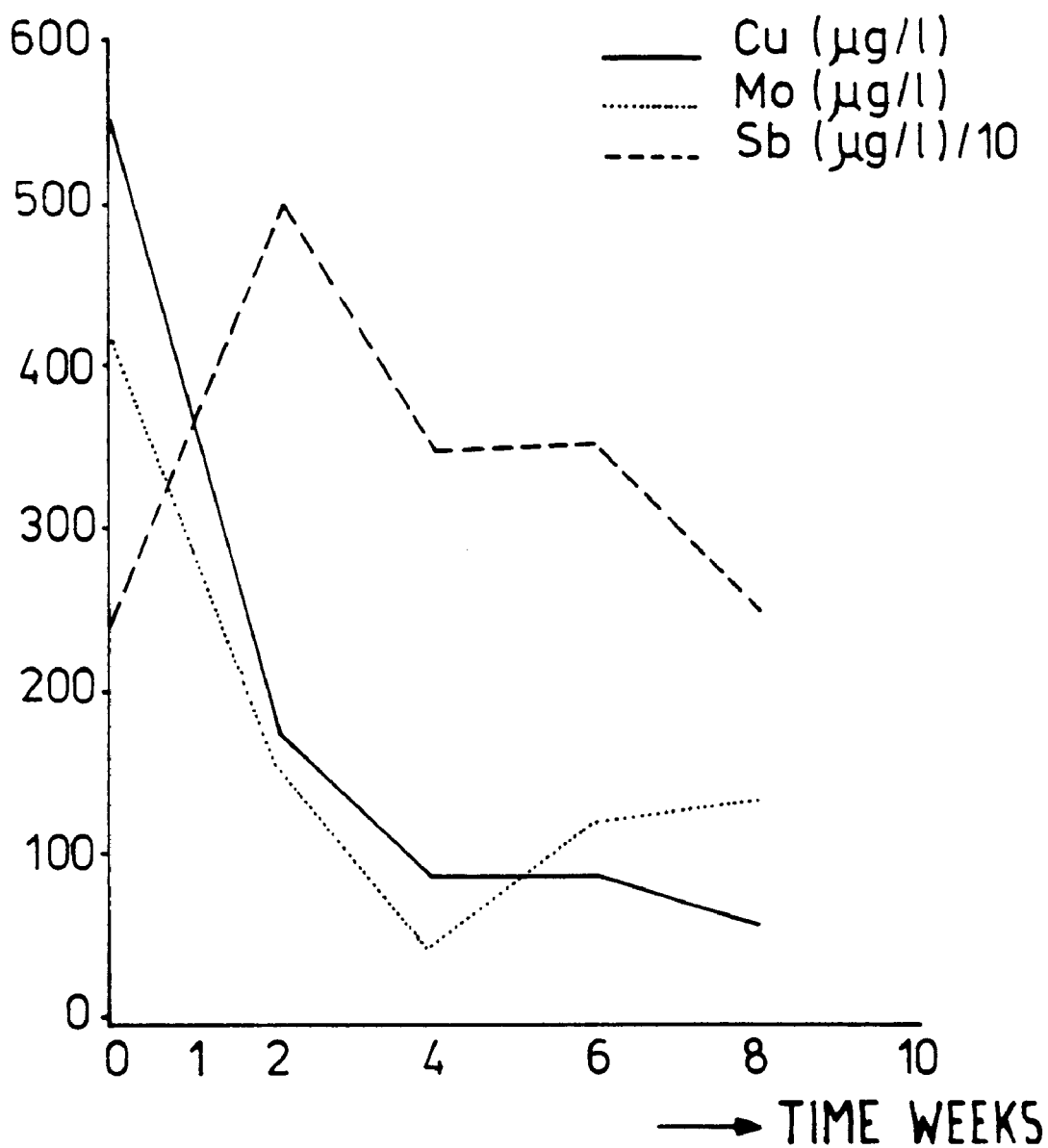
FIG. 4 is a graphical representation of the rate at which various metals are immobilized in one method of the invention.

This test has been carried out in accordance with the methods described in Example 1. Because sample were collected from the column every two weeks, a picture was obtained of the variation with time. This variation is shown in FIG. 4. From this it is evident that most of the decrease in the copper and molybdenum leaching of the WIP slag is achieved within a treatment time of two weeks. Depending on the initial quality of the slag (type of impurity and concentrations) and the required final quality level, a dwell time of two weeks or possibly shorter is adequate. In some situations, a longer dwell time will be necessary.

EXAMPLE 4

In this experiment slags have been treated for one hour with a $CO_2$/air mixture at an increased pressure (3.5 bar) and temperature (150° C.). At the beginning of the test, the gas mixture contained approximately 30% by volume of $CO_2$. The quality of the slag before and after the experiment has been determined by the leaching test described in Example 1. The results of this experiment are shown in Table 3. From this table it becomes evident that the abovementioned treatment results in an appreciable reduction (an order of magnitude 50% or more) in the leaching of copper, lead and aluminium. The leaching of the important component molybdenum (in this example) increases. This method of treatment is therefore only suitable for slags whose molybdenum leaching is not of substantial importance.

TABLE 1

Effect of treatment with $CO_2$-rich gas on the leaching of WIP slags. Leaching concentrations after 23 hours shaking with demineralized water, with liquid/solid ratio 10 (method in accordance with NEN 7343)

|  |  | Starting material | Air treatment (1) | Air + 8% by volume of $CO_2$ (2) |
|---|---|---|---|---|
| pH |  | 11.4 | 9.9 | 7.9 |
| COD | (mg/l) | 310 | 122 | 87 |
| antimony | (µg/l) | 10 | 35 | 35 |
| copper | (µg/l) | 1800 | 760 | 290 |
| lead | (µg/l) | 32 | 1 | <1 |
| molybdenum | (µg/l) | 560 | 240 | 105 |
| zinc | (µg/l) | <6 | <6 | 30 |
| aluminium | (µg/l) | 5100 | 5400 | 250 |

(1) reference; treatment for 10 weeks;
(2) treatment for 10 weeks.

TABLE 2

Bacterial and mould counts after treatment with air and air + $CO_2$ for 10 weeks

|  | Reference (air treatment) | Air + 8% by volume of $CO_2$ |
|---|---|---|
| Bacteria ($g^{-1}$) | <100 | $1 \times 10^6$ |
| Moulds ($g^{-1}$) | $4 \times 10^6$ | $1.2 \times 10^6$ |

TABLE 3

Effect of treatment with $CO_2$-rich gas at 3.5 bar/150° C. on the leaching of WIP slags. Leaching concentrations after 23 hours shaking with demineralized water, with liquid/solid ratio 10 (method in accordance with NEN 7343)

|  |  | Starting material | $CO_2$ treatment (1) |
|---|---|---|---|
| pH |  | 11.4 | 10.6 |
| OD | (mg/l) | 310 | 340 |
| antimony | (µg/l) | 10 | 23 |
| copper | (µg/l) | 1800 | 960 |
| lead | (µg/l) | 32 | 3 |
| molybdenum | (µg/l) | 560 | 830 |
| zinc | (µg/l) | <6 | <6 |
| aluminium | (µg/l) | 5100 | 2000 |

We claim:

1. A method of treating solid incineration residues, the residues having been removed from a furnace in which they remained after incineration of domestic waste materials in the furnace, in order to reduce the amount of at least one metal which can be leached from said residues by water, the metal being selected from copper, lead aluminum and molybdenum, the method consisting essentially of contacting said residues with a gas comprising (i) $CO_2$ in a concentration of at least 0.1% by volume, and (ii) oxygen, the contacting being carried out by passing the gas through the residues while the residues are in a vessel having a perforated floor, thus forming carbonates and reducing the pH of the residues by at least 0.8 and to a value from 7 to 10.6, the pH values being measured after shaking with demineralized water with a liquid solid ratio of 10 in accordance with standard NEN 7343.

2. A method according to claim 1 wherein the residues are treated with the gas at a temperature from the ambient temperature to 200° C. and under a pressure from atmospheric pressure to 10 bar overpressure.

3. A method according to claim 1 wherein the residues are treated at a temperature of not more than 100° C. and an overpressure of not more than 1 atmosphere, and the gas contains 5 to 20% by volume of carbon dioxide.

4. A method according to claim 1 wherein the gas comprises flue gases from a furnace in which waste materials are incinerated.

5. A method according to claim 4 wherein the gas is a mixture of air and off-gas containing carbon dioxide.

6. A method according to claim 1 which is carried out under conditions such that the treated residues have a pH of 7 to 8.5.

7. A method of treating solid incineration residues, the residues having been removed from a furnace in which they remained after incineration of domestic waste materials in the furnace, in order to reduce the amount of at least one metal which can be leached from said residues by water, the metal being selected from copper, lead aluminum and molybdenum, the method consisting essentially of contacting said residues with a gas comprising $CO_2$ in a concentration of 0.1 to 100% by volume, the contacting being carried out at a temperature of at most 100° C. by passing the gas through the residues while the residues are in a vessel having a perforated floor, thus forming carbonates and reducing the pH of the residues by at least 0.8 and to a value from 7 to 10.6, the pH values being measured after shaking with demineralized water with a liquid solid ration of 10 in accordance with standard NEN 7343.

8. A method according to claim 7 wherein the residues are treated at an overpressure of not more than 1 atmosphere, and the gas contains 5 to 20% by volume of carbon dioxide.

9. A method according to claim 7 wherein microorganisms and nutrients for the microorganisms are added to the residues before they are treated with the gas, the treatment is carried out at a temperature not higher than about 70° C., and the gas contains oxygen.

10. A method according to claim 9 wherein the gas contains water vapor.

11. A method according to claim 9 which is carried out under conditions such that the treated residues have a pH of 7 to 8.5.

12. A method of treating solid incineration residues resulting from the incineration of waste materials and containing unincinerated organic materials, in order to reduce the amount of at least one metal which can be leached from said residues by water, the metal being selected from copper, lead, aluminum and molybdenum, the method comprising contacting said residues with a gas comprising $CO_2$ in a concentration of at least 0.1% by volume, the contacting being carried out in the presence of microorganisms and under conditions such that the microorganisms cause degradation of unincinerated organic materials, thus forming carbonates and reducing the pH of the residues by at least 0.8 and to a value from 7 to 10.6, the pH values being measured after shaking with demineralized water with a liquid solid ration of 10 in accordance with standard NEN 7343.

13. A method according to claim 12 wherein the waste materials are domestic waste materials and at least some of the microorganisms are present naturally in the residues.

14. A method according to claim 12 wherein at least some of the microorganisms are added to the residues before they are treated with the gas.

15. A method according to claim 12 wherein the treatment is carried out at a temperature not higher than about 70° C.

16. A method according to claim 15 wherein the gas contains water vapor and oxygen.

17. A method according to claim 16 which is carried out under conditions such that the treated residues have a pH of 7 to 8.5.

* * * * *